(12) United States Patent
Houmura et al.

(10) Patent No.: US 7,664,498 B2
(45) Date of Patent: Feb. 16, 2010

(54) APPARATUS, METHOD, AND PROGRAM FOR READ OUT INFORMATION REGISTRATION, AND PORTABLE TERMINAL DEVICE

(75) Inventors: Toshikazu Houmura, Kawasaki (JP); Kazuhiro Yoshihara, Kawasaki (JP); Tohru Ida, Kawasaki (JP); Masahiro Nakajima, Kawasaki (JP); Katsuaki Akama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 11/427,368

(22) Filed: Jun. 29, 2006

(65) Prior Publication Data
US 2007/0218879 A1 Sep. 20, 2007

(30) Foreign Application Priority Data
Mar. 20, 2006 (JP) .............................. 2006-077228

(51) Int. Cl.
*H04W 4/00* (2009.01)
(52) U.S. Cl. ................. 455/435.1; 455/435.2; 455/410; 455/411; 455/412.1
(58) Field of Classification Search .............. 455/435.1, 455/435.2, 410, 411, 412.1
See application file for complete search history.

(56) References Cited
U.S. PATENT DOCUMENTS
6,370,519 B1 * 4/2002 Kim ............................ 707/1

| 6,674,537 | B2 * | 1/2004 | Kadowaki | ................... 358/1.15 |
| 2001/0002926 | A1 * | 6/2001 | Moon | ....................... 379/93.17 |
| 2004/0006469 | A1 | 1/2004 | Kang | |
| 2004/0057068 | A1 * | 3/2004 | Kadowaki | ................... 358/1.13 |
| 2006/0039548 | A1 * | 2/2006 | Houmura et al. | ....... 379/355.01 |

FOREIGN PATENT DOCUMENTS
| JP | 11-143483 | 5/1999 |
| JP | 11-161296 | 6/1999 |
| JP | 2000-261539 | 9/2000 |
| KR | 10-2004-0001594 | 1/2004 |

OTHER PUBLICATIONS
Office Action issued in corresponding Korean Patent Application No. 10-2006-0059543, on Jul. 31, 2007.

* cited by examiner

*Primary Examiner*—Joseph H Feild
*Assistant Examiner*—Huy D Nguyen
(74) *Attorney, Agent, or Firm*—Staas & Halsey LLP

(57) ABSTRACT

The present invention relates to registration of read out information corresponding to written information and is intended to improve operationality of the registration or deletion of the written information and the read out information. The present invention relates to a read out information registration apparatus (e.g., cellular phone) that registers the read out information corresponding to the written information, and the registration (or deletion) of the read out information is performed in conjunction with the registration (or deletion) of the written information such as telephone directory information of a name of an opposite party, etc., a word used in e-mail, etc., and address descriptions to centralize the operation and process. A user is constrained from performing processes such as edition and deletion of the registration contents of the read out information, and the written information and the read out information are managed in a centralized manner.

19 Claims, 17 Drawing Sheets

US 7,664,498 B2

APPARATUS, METHOD, AND PROGRAM FOR READ OUT INFORMATION REGISTRATION, AND PORTABLE TERMINAL DEVICE

CROSS-REFERENCE TO RELATED APPLICATIONS

This application is based upon and claims the benefit of priority from the prior Japanese Patent Application No. 2006-77228, filed on Mar. 20, 2006, the entire contents of which are incorporated herein by reference.

BACKGROUND OF THE INVENTION

1. Field of the Invention

The present invention relates generally to registration of read out information included in a portable terminal device such as a cellular phone where read out information is registered in a memory dictionary correspondingly to written information such as characters and character strings used in e-mails, etc. so as to output the e-mail with a voice, and more particularly, to a read out information registration apparatus, a method thereof, a program thereof, and a portable terminal device that link the registrations of the written information and the read out information.

2. Description of the Related Art

For example, in a cellular phone including a read out function, when a name of an opposite party or a word used in e-mails is registered, the same name or word is registered in a read out dictionary to read out thereof.

With regard to reading out of written information such as characters or character strings, in the disclosure of Japanese Patent Application Laid-Open Publication No. 1999-161296, by automatically registering speech information generated based on input information into a read out dictionary, the reading out of a document is achieved by the speech information. In the disclosure of Japanese Patent Application Laid-Open Publication No. 2000-261539, a speech data storage area is set in a memory to store speech data corresponding to characters or character strings, and the speech data corresponding to character or character strings of telephone directory data are read from the speech data storage area based on the telephone directory data searching input to output voice.

By the way, in the registration of a name of an opposite party or a word, if the written information and the read out information are registered separately, the registration process becomes cumbersome. If the information is registered in the read out dictionary at the same time, consistency of the registration contents may be impaired depending on operations of a user even when the registration operation is performed concurrently, and if a storage capacity is limited, expansion of the registration of the read out information may bring pressure on a user registration area for registering other pieces of information.

Japanese Patent Application Laid-Open Publication Nos. 1999-161296 and 2000-261539 do not disclose or indicate such problems and do not disclose or indicate a configuration or concept for solving the problems.

SUMMARY OF THE INVENTION

An object of the present invention relates to the registration of the read out information corresponding to the written information and is to improve operationality of the registration or deletion of the written information and the read out information.

Another object of the present invention relates to the registration of the read out information corresponding to the written information and is to enhance consistency of the written information and the read out information.

The present invention relates to a read out information registration apparatus that registers the read out information corresponding to the written information, and the registration (or deletion) of the read out information is performed in conjunction with the registration (or deletion) of the written information such as telephone directory information of a name of an opposite party, etc., a word used in e-mail, etc., and address descriptions to centralize the operation and process. A user is constrained from performing processes such as edition and deletion of the registration contents of the read out information, and the written information and the read out information are managed in a centralized manner. The above objects are achieved by such a configuration.

In order to achieve the above objects, according to a first aspect of the present invention there is provided a read out information registration apparatus that registers read out information corresponding to written information to output the read out information based on retrieval of the written information, the read out information registration apparatus comprising a first registration area where the written information is registered; a second registration area where the read out information corresponding to the written information is registered; and a processing unit that processes the registration of the read out information to the second registration area in conjunction with the registration of the written information to the first registration area. The written information is written linguistic information such as a name of an opposite party and a word used in e-mail. The read out information is information such as the reading corresponding to the written information, a nickname corresponding to name, the reading set by a user for a word, etc. In the registration of the information, if the read out information is registered in conjunction with the registration of the written information, the both processes can be consolidated and centralized to maintain a relationship such that the read out information is consequently registered when the written information is registered, and operationality and consistency of the both pieces of information can be maintained to achieve the above objects.

Preferably, in the read out information registration apparatus, the second registration area is a hidden area where the read out information cannot be displayed, changed, or deleted. According to such a configuration, since the read out information and the written information cannot be processed separately, consistency of the both pieces of information can be maintained sophisticatedly. The above objects can also be achieved in such a configuration.

The read out information registration apparatus may comprise a third registration area where written information not intended to register the read out information is registered, wherein if information is relevant to the written information of the third registration area, the registration of the read out information to the second registration area is prevented or made invalid.

In the read out information registration apparatus, the read out information corresponding to the written information may be deleted from the second registration area in conjunction with the deletion of the written information from the first registration area.

To achieve the above objects, according to a second aspect of the present invention there is provided a read out information registering method that registers read out information corresponding to written information to output the read out information based on retrieval of the written information, the read out information registering method comprising the steps of registering the written information to a first registration area; and registering the read out information corresponding to the written information to a second registration area in conjunction with the above step.

The read out information registering method may comprise the steps of determining whether or not written information to be registered is written information not intended to register the read out information; and preventing or making invalid the registration of the read out information to the second registration area if the written information to be registered is the written information not intended to register the read out information.

The read out information registering method may comprise the step of deleting the read out information corresponding to the written information from the second registration area in conjunction with the deletion of the written information from the first registration area.

To achieve the above objects, according to a third aspect of the present invention there is provided a read out information registering program executable by a computer, that registers read out information corresponding to written information to output the read out information based on retrieval of the written information, the read out information registering program comprising the steps of registering the written information to a first registration area; and registering the read out information corresponding to the written information to a second registration area in conjunction with the above step.

The read out information registering program may comprise the steps of determining whether or not written information to be registered is written information not intended to register the read out information; and preventing or making invalid the registration of the read out information to the second registration area if the written information to be registered is the written information not intended to register the read out information.

The read out information registering program may comprise the step of deleting the read out information corresponding to the written information from the second registration area in conjunction with the deletion of the written information from the first registration area.

To achieve the above object, according to a fourth aspect of the present invention there is provided a portable terminal device that registers read out information corresponding to written information to output the read out information based on retrieval of the written information, the portable terminal device comprising a first registration area where the written information is registered; a second registration area where the read out information corresponding to the written information is registered; and a processing unit that processes the registration of the read out information to the second registration area in conjunction with the registration of the written information to the first registration area.

In the portable terminal device, the second registration area may be a hidden area where the read out information cannot be displayed, changed, or deleted.

The portable terminal device may comprise a third registration area where written information not intended to register the read out information is registered, wherein if information is relevant to the written information of the third registration area, the registration of the read out information to the second registration area is prevented or made invalid.

In the portable terminal device, the readout information may be reading pronunciation related to opposite party information and/or linguistic information.

In the portable terminal device, the read out information corresponding to the written information may be deleted from the second registration area in conjunction with the deletion of the written information from the first registration area.

The features and advantages of the present invention are listed as follows.

(1) Since the read out information can be registered concurrently with the registration of the written information, operationality can be improved.

(2) Since the read out information is registered by registering the written information, consistency can be maintained for the both pieces of information.

(3) Since the read out information cannot be processed separately, consistency of the written information and the read out information is not impaired; the registration area is not bloated by freely registering the read out information; and pressure is not brought on the registration of other pieces of information.

BRIEF DESCRIPTION OF THE DRAWINGS

The above and other objects, features, and advantages of the present invention will become more apparent from the following detailed description of the preferred embodiments when taken in conjunction with the accompanying drawings, in which.

DESCRIPTION OF THE PREFERRED EMBODIMENTS

First Embodiment

Figure 1:
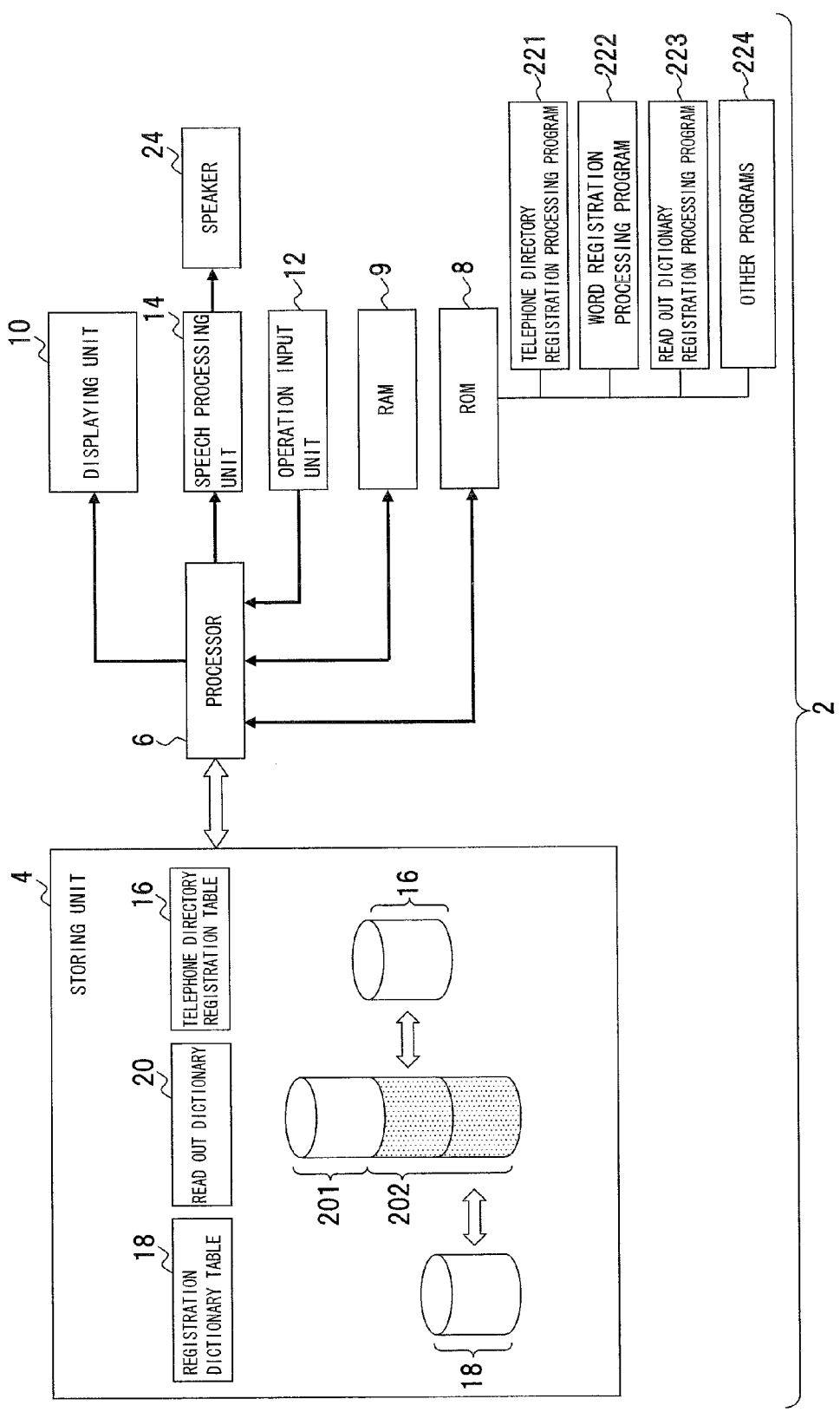
FIG. 1 is a block diagram of a cellular phone according to a first embodiment.

A first embodiment of the present invention will be described with reference to FIG. 1. FIG. 1 is a block diagram of a cellular phone according to the first embodiment.

This cellular phone 2 is an example of an information registration apparatus or portable terminal device of the present invention, which is a system that registers written information such as characters or character strings and read out information, i.e., speech conversion information, to reproduce the read out information as speech output by retrieving the written information.

The cellular phone 2 includes a storing unit 4, a processor 6, ROM (Read-Only Memory) 8, RAM (Random-access memory) 9, a displaying unit 10, an operation input unit 12, a speech processing unit 14, etc. The storing unit 4 is a storing unit that stores the written information and the read out information thereof, is constituted by ROM, RAM, etc., and includes a telephone directory registration table 16, a registration dictionary table 18, and a read out dictionary 20 in this case.

The telephone directory registration table 16 and the registration dictionary table 18 are a first registration area for registering the written information; the telephone directory registration table 16 is used for registration of the written information such as characters and character strings, including names of opposite parties, telephone numbers, e-mail addresses, etc.; and the registration dictionary table 18 is used for registration of word information such as characters and character strings.

The read out dictionary 20 is a read out information registration area for registering the read out information and the read out dictionary 20 is disposed with a user registration area 201 and a hidden registration area 202 constituting a second registration area correspondingly to the telephone directory registration table 16 or the registration dictionary table 18, which are the first registration area. The hidden registration area 202 is disposed with the same number of registration tables as the telephone directory registration table 16 and the registration tables are used for registering the read out information corresponding to the opposite parties, in this case. The hidden registration area 202 is disposed with a registration area corresponding to the registration dictionary table 18 and the registration area is used for registering the read out information corresponding to the registered words.

The hidden registration area 202 has registration contents linked to the telephone directory registration table 16 and the registration dictionary table 18; the read out information is read from the hidden registration area 202 based on the retrieval in the telephone directory registration table 16 and the registration dictionary table 18; the registration and deletion of the read out information is dependent on the telephone directory registration table 16 and the registration dictionary table 18; and the hidden registration area 202 cannot be displayed, changed, or deleted independently and separately from the telephone directory registration table 16 and the registration dictionary table 18. On the other hand, desired read out information selected by a user is stored in the user registration area 201 and can be registered or deleted arbitrarily.

The processor 6 is constituted by CPU (Central Processing Unit), etc., and is a processing unit that executes programs stored in the ROM 8 to perform various controls such as the registration/deletion or retrieval of information in the storing unit 4, the display control in the displaying unit 10, the control of information input from the operation input unit 12, and the speech reproduction control in the speech processing unit 14. The ROM 8 stores a telephone directory registration processing program 221, a word registration processing program 222, a read out dictionary registration processing program 223, other programs 224, etc. The RAM 9 is used as a work area.

The displaying unit 10 is controlled by the processor 6, is constituted by LCD (Liquid Crystal Display) for example, and displays an opposite party read from the telephone directory registration table 16, a destination or main body of an e-mail, etc. The operation input unit 12 includes a keyboard and is used for keyboard character input, etc. The operation input unit 12 may include a connecting unit for a host computer, etc., and may take in from the host computer the input information that should be registered in stead of the keyboard.

The speech processing unit 14 includes a speaker 24 and converts the read out information output from the processor 6 into a speech signal, and the speaker 24 converts the speech signal into voice that is output.

In such a configuration, when the telephone directory registration processing program 221, the word registration processing program 222, and the read out dictionary registration processing program 223 are activated to input from the operation input unit 12 a name of an opposite party or a word, place name, etc. used in e-mails, etc., which should be registered, the read out information can be registered into the hidden registration area 202 of the read out dictionary 20 correspondingly to the written information registered into the telephone directory registration table 16 or the registration dictionary table 18.

When it is assumed that the name of the opposite party is ""青木(Aoki)", written in Chinese characters, that is normally read as "AOKI", for example, "MITCHAN" can be registered as user-specified read out information into the hidden registration area 202.

Similarly, when a name registered into the registration dictionary table 18 is, for example, ""青木 (Aoki)" written in Chinese characters that is normally read as "AOKI", for example, "MITCHAN" is registered as the user-specified read out information. In the case of a place name, for example, when it is assumed that ""小山(Koyoma)" written in Chinese characters is normally read as "KOYAMA", "OYAMA" can be registered as the reading thereof.

Figure 2:
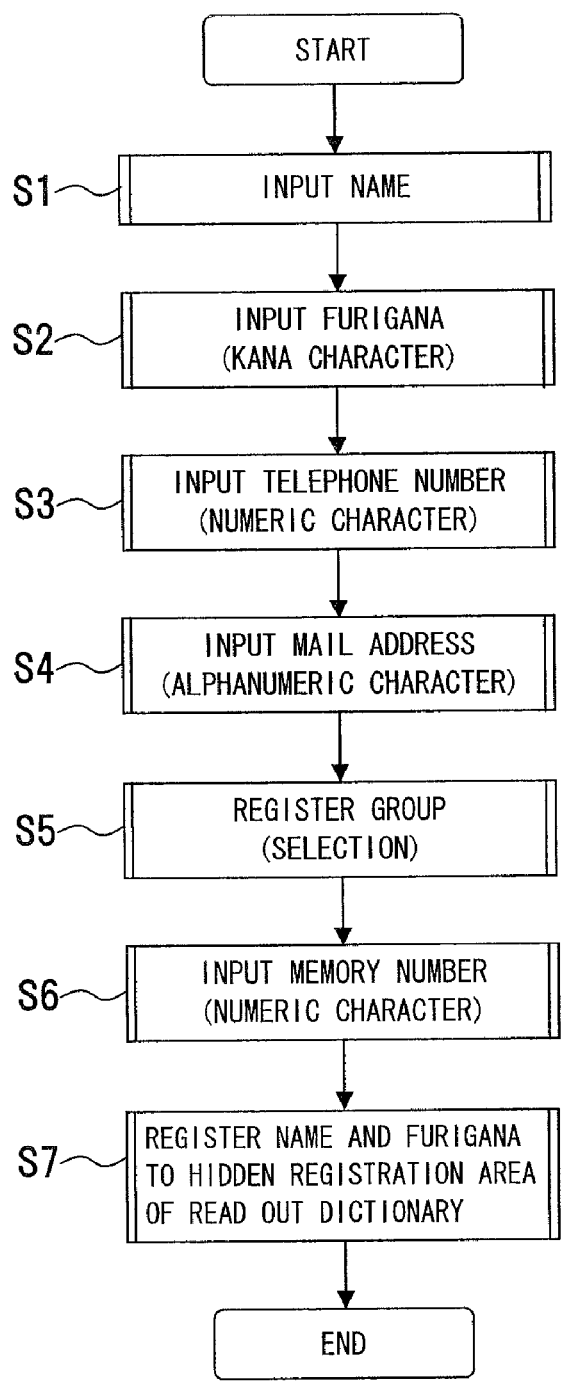
FIG. 2 is a flowchart of a process procedure of telephone directory registration.

The telephone directory registration will be described with reference to FIG. 2. FIG. 2 is a flowchart of a process procedure of the telephone directory registration.

This telephone directory registration process includes a changing process of the registration information already registered. For example, when it is assumed that the user registration area 201 is 0 to 99 (=n) in the registration area of the read out dictionary 20, the hidden registration area 202 is 100 to (=n+100), for example.

When the telephone directory registration processing program 221 is activated in this telephone directory registration, the registration processing program 223 of the read out dictionary 20 is activated.

When the telephone directory registration is selected from a default menu to activate the telephone directory registration processing program 221, a dialogue screen for the telephone directory registration is displayed on the displaying unit 10. In accordance with inquiry messages on the dialogue screen, a name is input in a name input field (step S1); FURIGANA is input in a FURIGANA input field (step S2), where FURIGANA is kana characters of Japanese phonetic syllabary to show how to pronounce; a telephone number is input in a telephone number input field (step S3); a mail address is input in a mail address input field (step S4); a group is registered in a group registration input field (step S5); a memory number is input with numeric characters in a memory number input field (step S6); and the read out information of the name and the FURIGANA is registered (step S7).

The group registration at step S5 is performed in accordance with an inquiry message asking whether a group is registered or not. The registration of the read out information of the name and the FURIGANA at step S7 is registration of pronunciation of the read out output, and the pronounced sound of the name and the FURIGANA is registered into the hidden registration area 202 of the read out dictionary 20. As described above, the memory number input area at step S6 is "n", for example, and the hidden registration area 202 at step S7 is "n+100", for example.

The process of steps S1 to S7 is the same as the case of changing the telephone directory registration information.

Figure 3:
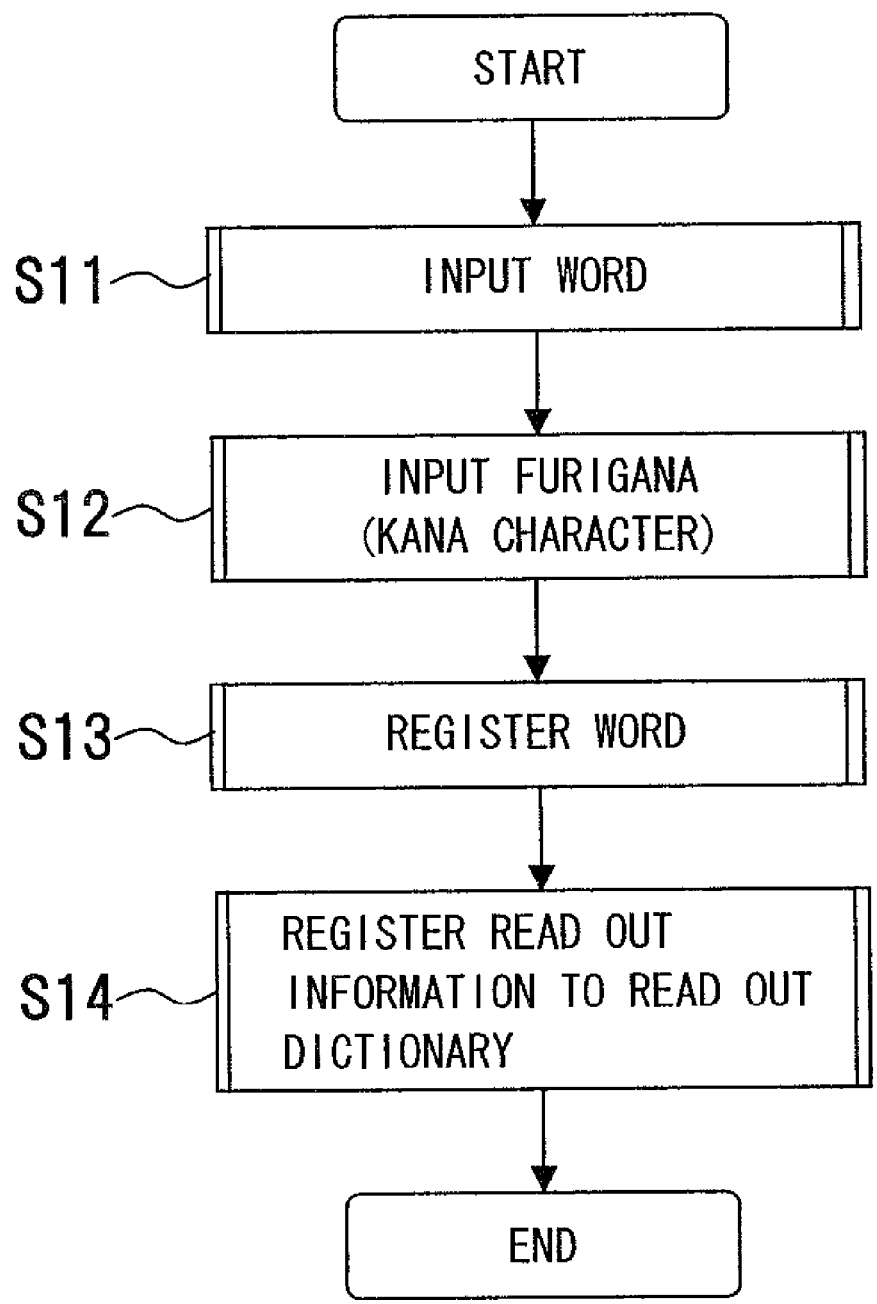
FIG. 3 is a flowchart of a process procedure of word registration and read out dictionary registration.

The word registration will be described with reference to FIG. 3. FIG. 3 is a flowchart of a process procedure of the word registration and the read out dictionary registration.

In this process, when the word registration processing program 222 is activated in the word registration, the registration processing program 223 of the read out dictionary 20 is activated.

In this word registration, a word is input from the dialogue screen (step S11); FURIGANA of the word is input (step S12); the corresponding word is selected for registration into the registration dictionary table 18 (step S13); and the read out information corresponding to the FURIGANA is registered into the read out dictionary 20 in a linked manner (step S14).

Figure 4:
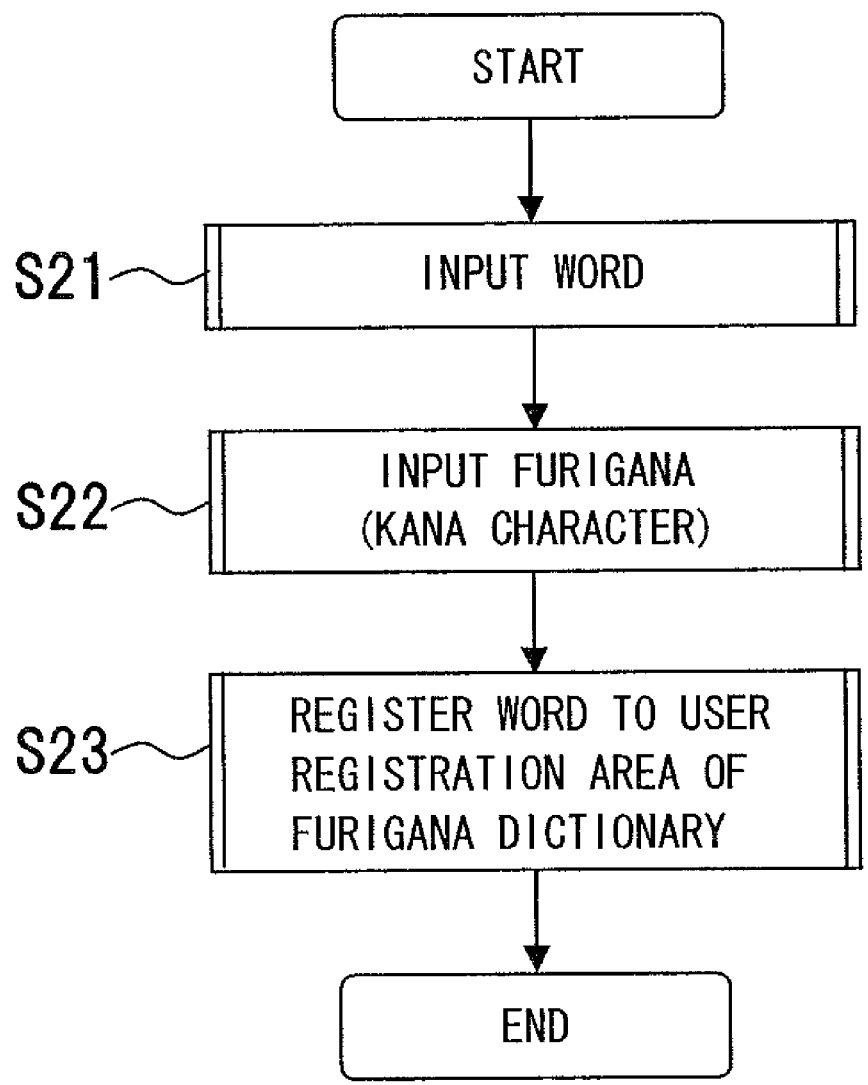
FIG. 4 is a flowchart of another process procedure of word registration and read out dictionary registration.

In this case, if the registration processing program 223 of the read out dictionary 20 is not activated, as shown in FIG. 4, a word is input from the dialogue screen (step S21); FURIGANA of the word is input (step S22); and the corresponding word can be selected for registration into the user registration area 201 of a FURIGANA dictionary (step S23). In this case, the input information at steps S11, S12 is registered in the aforementioned area of 0 to 99 (=n) of the user registration area 201.

Figure 5:
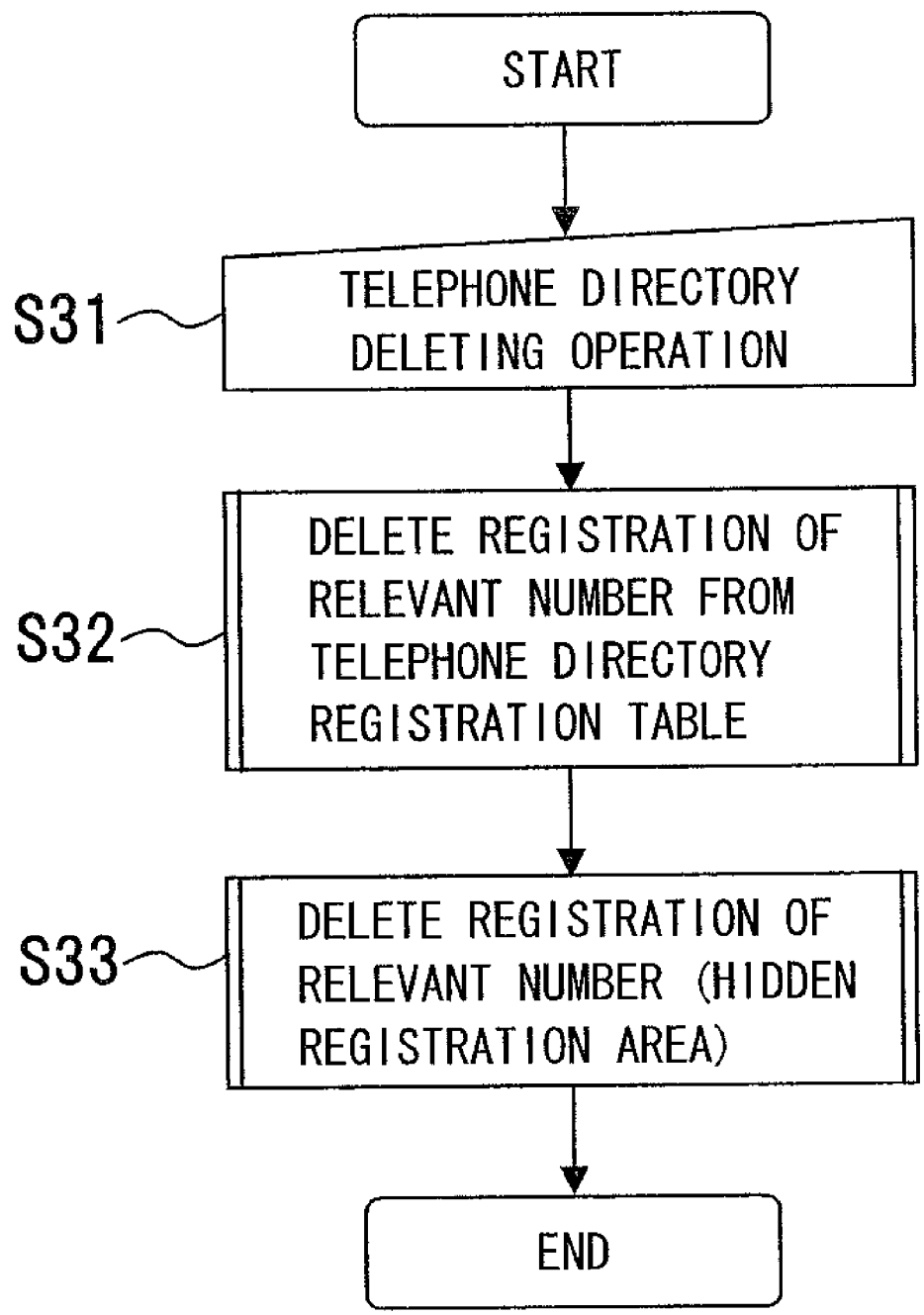
FIG. 5 is a flowchart of a process procedure of deleting the registration information in the telephone directory.

The deletion of the registration information in the telephone directory will be described with reference to FIG. 5. FIG. 5 is a flowchart of a process procedure of deleting the registration information in the telephone directory.

When the telephone directory deletion is selected from the default menu to activate a program for the deletion process included in the telephone directory registration processing program 221, a dialogue screen for the telephone directory deletion is displayed on the displaying unit 10. In accordance with inquiry messages on the dialogue screen, a telephone directory deleting operation is performed (step S31). The registration of the relevant number n is deleted from the telephone directory registration table 16 (step S32). In this case, the nth registered telephone directory registration is deleted.

Correspondingly to this deletion, the registration information of the hidden registration area 202 is deleted (step S33). Therefore, if a name is deleted from the telephone directory, the information corresponding to the read out voice of the name is also deleted in a linked manner. In this case, since the hidden registration area 202 is not displayed, the registration information cannot be deleted from the hidden registration area 202.

Figure 6:
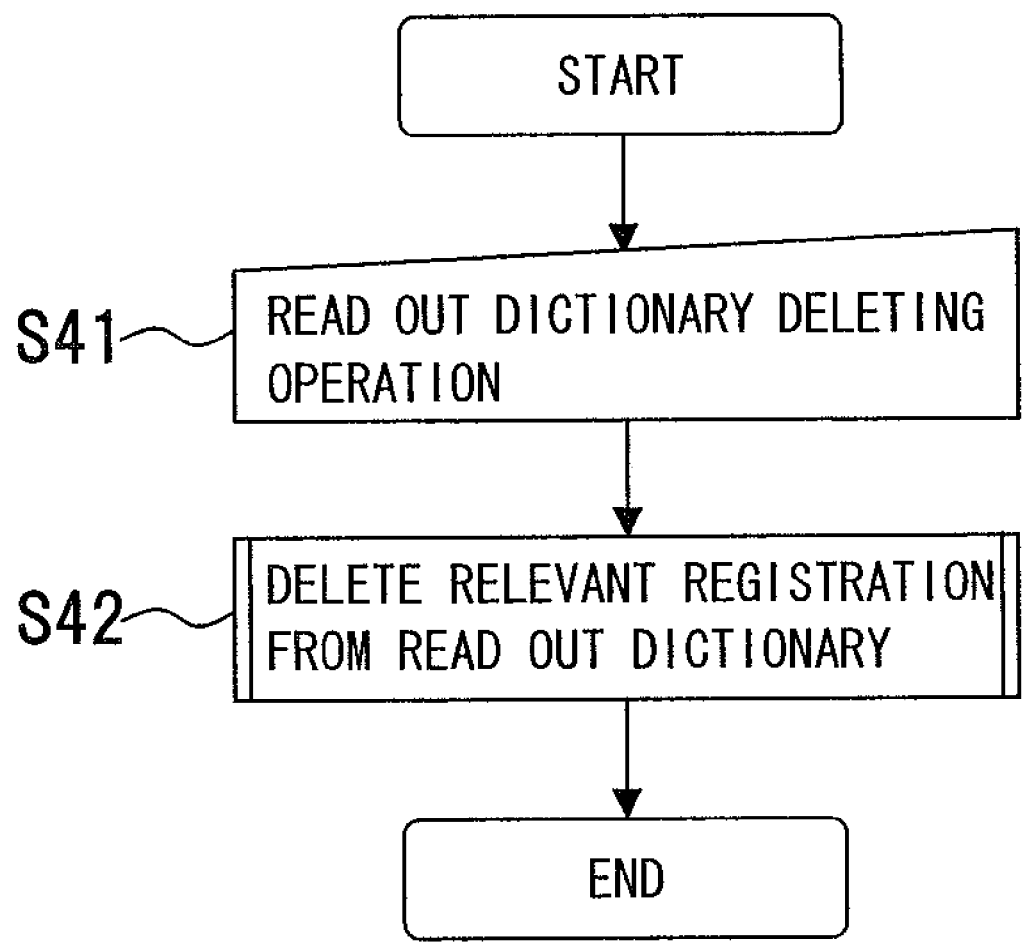
FIG. 6 is a flowchart of a process procedure of deleting the registration information in the read out dictionary.

The deletion of the registration information in the read out dictionary will be described with reference to FIG. 6. FIG. 6 is a flowchart of a process procedure of deleting the registration information in the read out dictionary.

When the read out dictionary deletion is selected and activated from the default menu, a dialogue screen for the read out dictionary deletion is displayed on the displaying unit 10. In accordance with inquiry messages on the dialogue screen, a read out dictionary deleting operation is performed (step S41). The relevant registration is deleted from the read out dictionary 20 and the information in the user registration area 201 is deleted (step S42). In this case, the registration information of Nos. 0 to 99 is deleted. The registration information of the hidden registration area 202 is not deleted separately.

Figure 7:
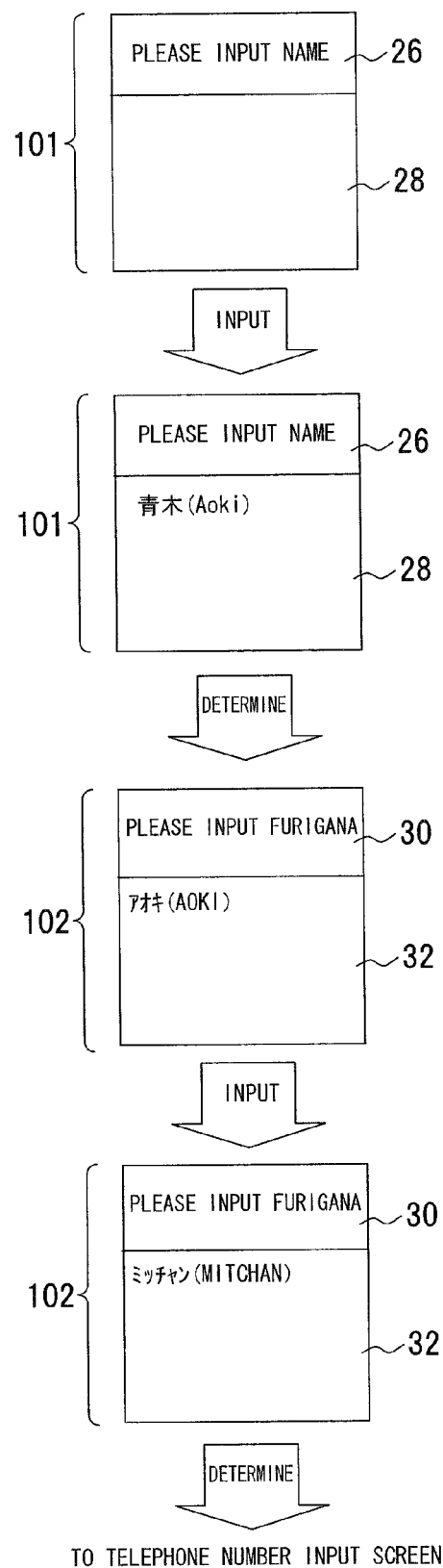
FIG. 7 shows development of a display screen corresponding to the process procedures of the telephone directory registration and the registration of read out speech characters.
Figure 8:
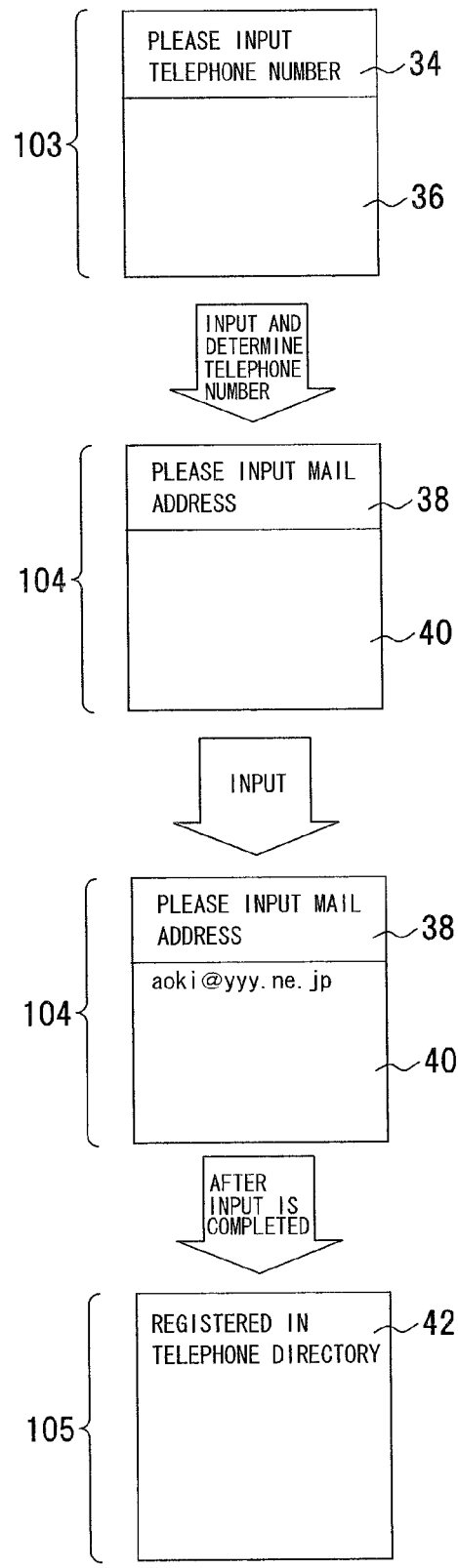
FIG. 8 shows development of a display screen corresponding to the process procedures of the telephone directory registration and the registration of read out speech characters.

Description will be made of the telephone directory registration and the registration of the read out speech characters with reference to FIGS. 7 and 8. FIGS. 7 and 8 show development of a display screen corresponding to the process procedures of the telephone directory registration and the registration of the read out speech characters.

As shown in FIG. 7, when the telephone directory registration is selected from the default menu to activate the telephone directory registration processing program 221, a dialogue screen 101 for the telephone directory registration is displayed on the displaying unit 10. The dialogue screen 101 displays a message 26 prompting the input of the opposite party name and an input field 28 for the name. For example, the displayed message 26 is:

"Please input name"

and the name is input in the input field 28 in accordance with this message 26. In this case, ""青木 (Aoki)" has been input written in Chinese characters, which is an example of the name.

If a decision key of the operation input unit 12 is pressed after inputting the name, the input is determined and a next dialog screen 102 is displayed. This dialogue screen 102 displays a message 30 prompting the input of FURIGANA corresponding to the previously input name and an input field 32 for the FURIGANA. For example, the displayed message 30 is:

"Please input FURIGANA"

and since FURIGANA of ""青木 (Aoki)" is displayed as ""アオキ(AOKI)" on the input field 32 along with the message 30, FURIGANA representing the read out voice is input in the input field 32 on the dialogue screen 102 in accordance with the message 30. In this case, ""ミッチャン (MITCHAN)" has been input, which is FURIGANA representing pronunciation of a nickname of ""青木 (Aoki)".

If the decision key of the operation input unit 12 is pressed after inputting the FURIGANA, the input is determined and a next dialog screen 103 is displayed as shown in FIG. 8. This dialogue screen 103 displays a message 34 prompting the input of a telephone number of the opposite party of the previously input name and an input field 36 for the telephone number. For example, the displayed message 34 is:

"Please input telephone number"

and the telephone number is input in the input field 36 in accordance with this message 34.

If the decision key of the operation input unit 12 is pressed after inputting the telephone number, the input telephone number is determined and a next dialog screen 104 is displayed, and this dialogue screen 104 displays a message 38 prompting the input of a mail address of the opposite party of the previously input name and an input field 40 for the mail address. For example, the displayed message 38 is:

"Please input mail address"

and the mail address is input in the input field 40 in accordance with this message 38.

If the decision key of the operation input unit 12 is pressed after the input, the input information is registered and a notification screen 105 is displayed. A message 42 is displayed on this notification screen 105 and, for example, the displayed message 42 is as follows.

"Registered in telephone directory"

The display of the message 42 indicates that the registration is established and, in this case, the name ""青木 (Aoki)" and the read out voice "MITCHAN" are registered concurrently in the read out dictionary 20.

Figure 9:
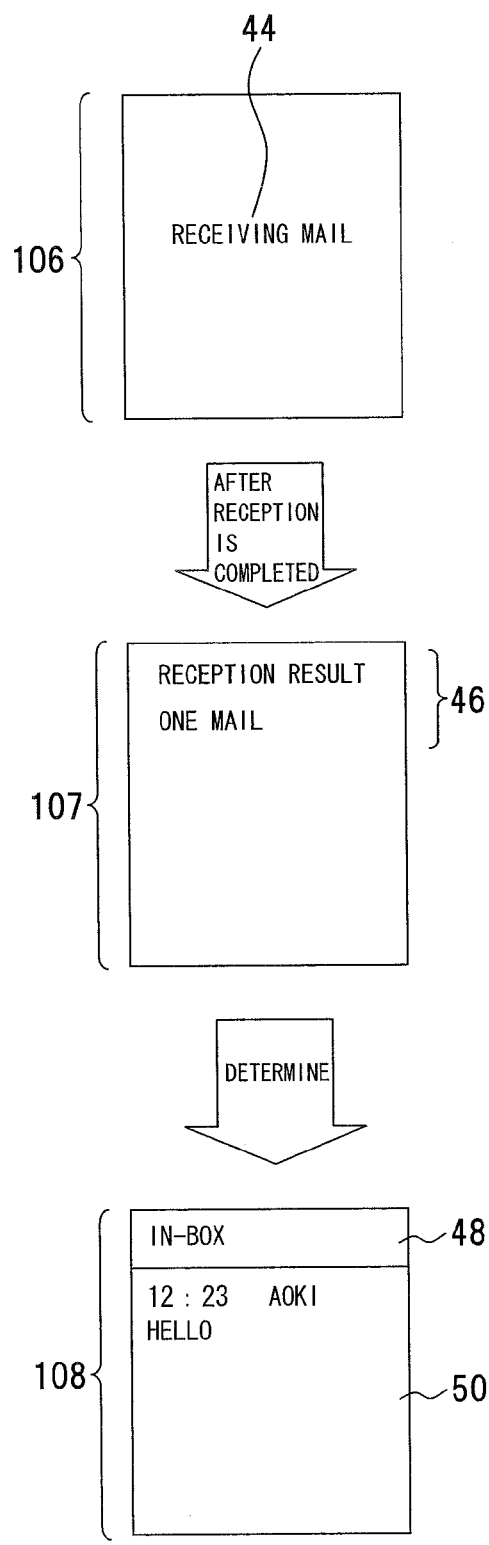
FIG. 9 shows a process procedure for receiving an e-mail.
Figure 10:
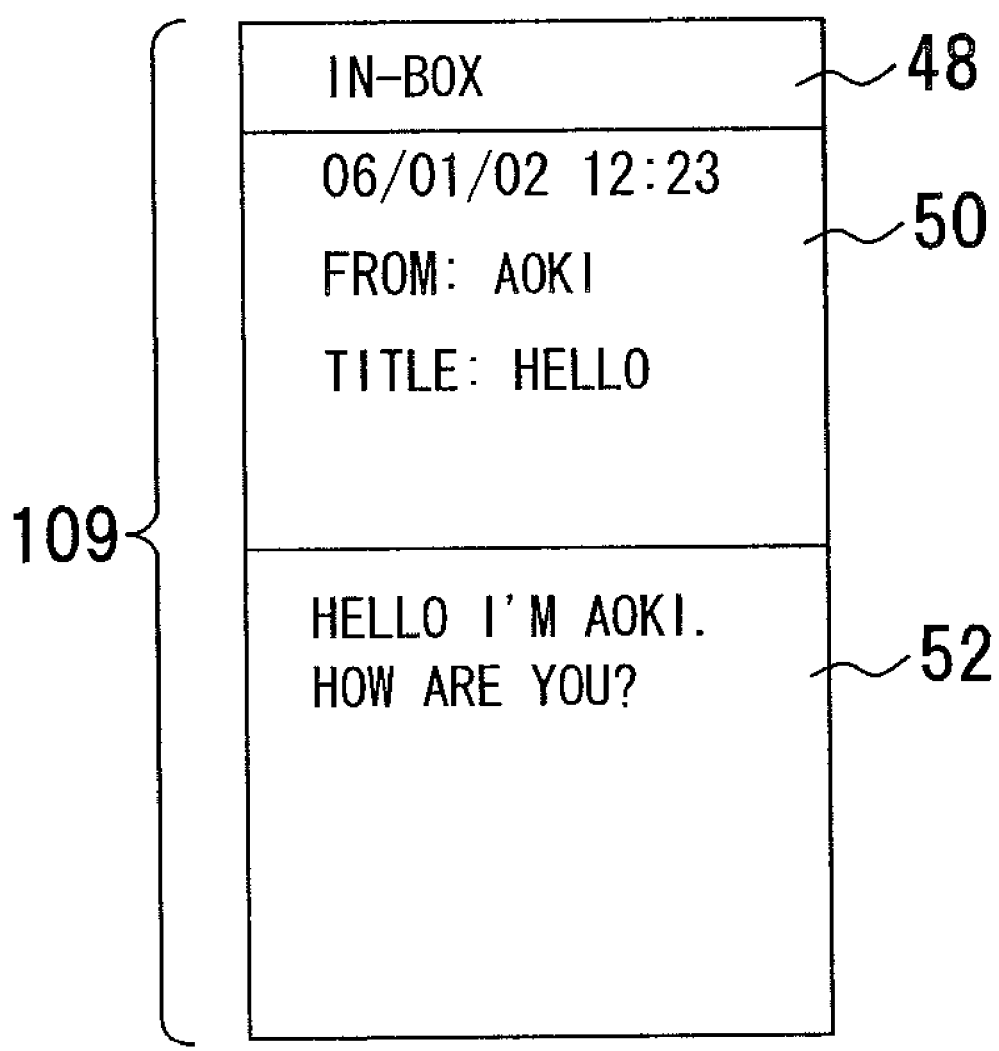
FIG. 10 shows the received e-mail and the read out process thereof.

An e-mail reception process will be described with reference to FIGS. 9 and 10. FIG. 9 shows a process procedure for receiving an e-mail and FIG. 10 shows the received e-mail and the read out process thereof.

When the cellular phone 2 receives an e-mail from an opposite party, for example, a standby screen is changed to a mail reception display screen 106 indicating that an e-mail is being received, as shown in FIG. 9, and this mail reception display screen 106 displays a message 44 indicating that an e-mail is being received. The displayed message 44 is "receiving mail", for example. When the e-mail is completely received, the screen is changed to a reception result display screen 107, and a message 46 is displayed to indicate a reception result of the e-mail and the number thereof. The displayed message 46 is, for example, "reception result" as well as "one mail" indicating the number of mails. In this case, one mail has been received. The received mail is stored in a received mail folder.

When the received mail in the received mail folder is specified and the decision key of the operation input unit 12 is pressed, the screen is changed to a mail display screen 108 and the mail display screen 108 displays "in-box" in a title display portion 48 to indicate a received mail folder name where the received mail is stored and displays a received time, sender's name, and title, etc. in a message display portion 50. In this display, the received time is "12:23"; the sender's name is "Aoki"; and the title is "Hello".

When the mail display screen 108 is developed on the displaying unit 10 in this way, the registration information of the read out dictionary 20 is referenced to read out the information displayed on the mail display screen 108, and the read out speech output is as follows.

"FIRST MAIL
THIS MAIL IS RECEIVED AT TWELVE TWENTY THREE
THIS MAIL IS FROM MITCHAN
TITLE IS HELLO"

In this case, since the sender's name "Aoki" is registered as "MITCHAN" in the read out dictionary 20, the portion of "Aoki" is read out as "MITCHAN".

As shown in FIG. 10, the main body of the mail is displayed on the mail display screen 109 from the received mail folder. The mail display screen 109 displays the received mail folder name "in-box" in the title display portion 48 and a received time, sender's name, and title in a message display portion 50, and the received time "06/01/02 12:23", the sender's name "Aoki", and the title "Hello" are displayed. In a mail main body display portion 52 located below, the main body of the mail is developed which is displayed as "Hello, I'm Aoki. How are you?"; the registration information in the read out dictionary 20 is referenced to read out the information; and the read out speech output is as follows.

"FIRST MAIL
THIS MAIL IS RECEIVED AT TWELVE TWENTY THREE ON JANUARY SECOND TWO THOUSAND SIX
THIS MAIL IS FROM MITCHAN
TITLE HELLO
MAIN BODY HELLO
I'M MITCHAN HOW ARE YOU"

As revealed from this embodiment, since the registration information is processed and automatically registered or deleted in the hidden registration area 202 of the read out dictionary 20 in conjunction with the activation of the registration or deletion process of the telephone directory information in the cellular phone 2, the processes are consolidated in the registration of the written information and the registration of the read out information and the user operationality is improved.

Since the read out information corresponding to the word registration is processed and registered or deleted in the hidden registration area 202 in conjunction with the activation of the word registration or deletion process in the cellular phone 2, the processes are consolidated in the registration or deletion of the written information and the read out information as well and the user operationality is also improved in the word registration. The consistency is achieved and maintained between the registration of the written information and the registration of the read out information. Since the registered word is in an area hidden from the user, i.e., is not displayed on the displaying unit 10, the deletion or processing operations targeting the registration contents cannot be performed; the telephone directory information and the hidden read out information are guaranteed and maintained to be identical; and the same applies to the registered word and the hidden registration information thereof.

Second Embodiment

Figure 11:
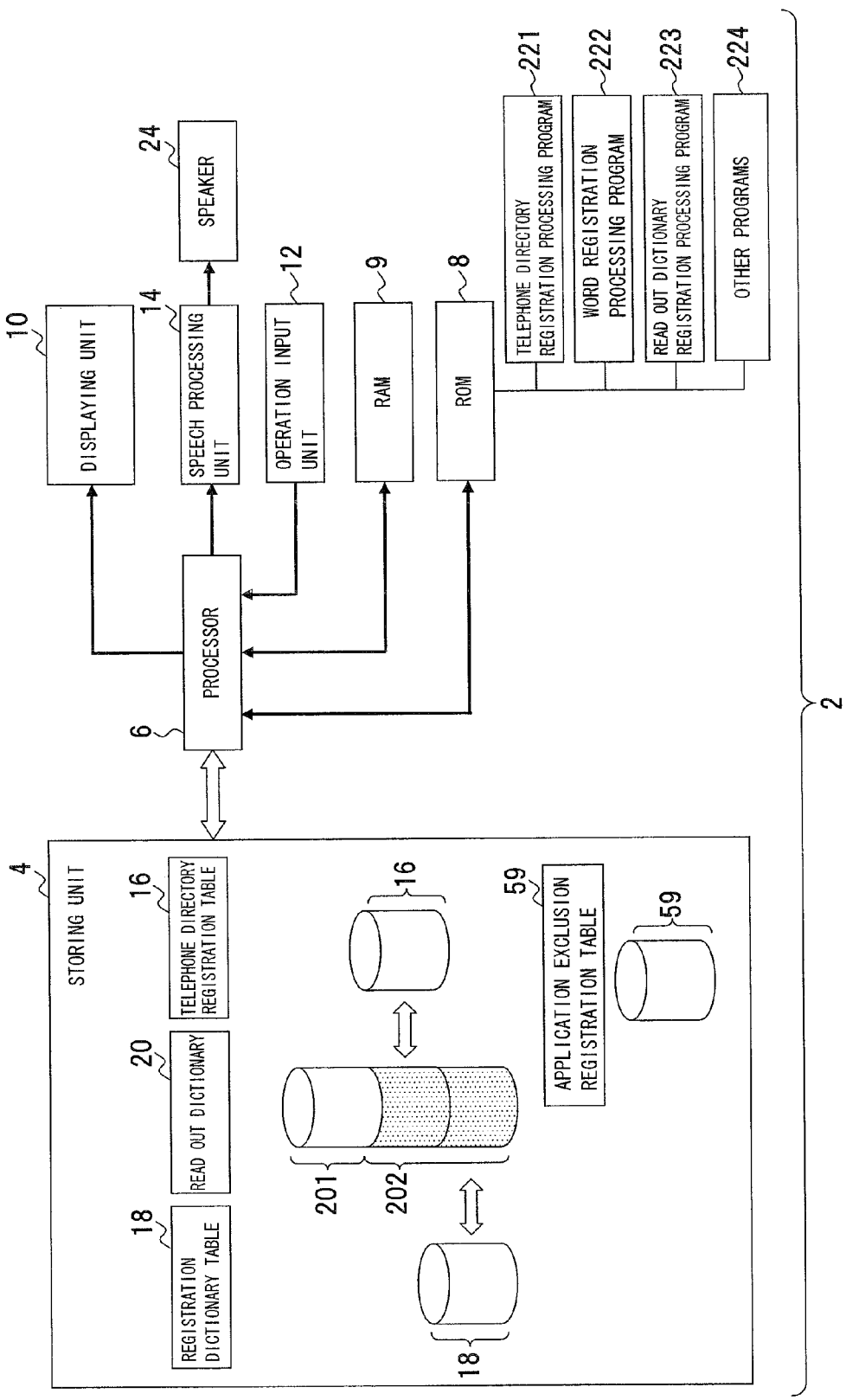
FIG. 11 is a block diagram of a cellular phone according to a second embodiment.
Figure 12:
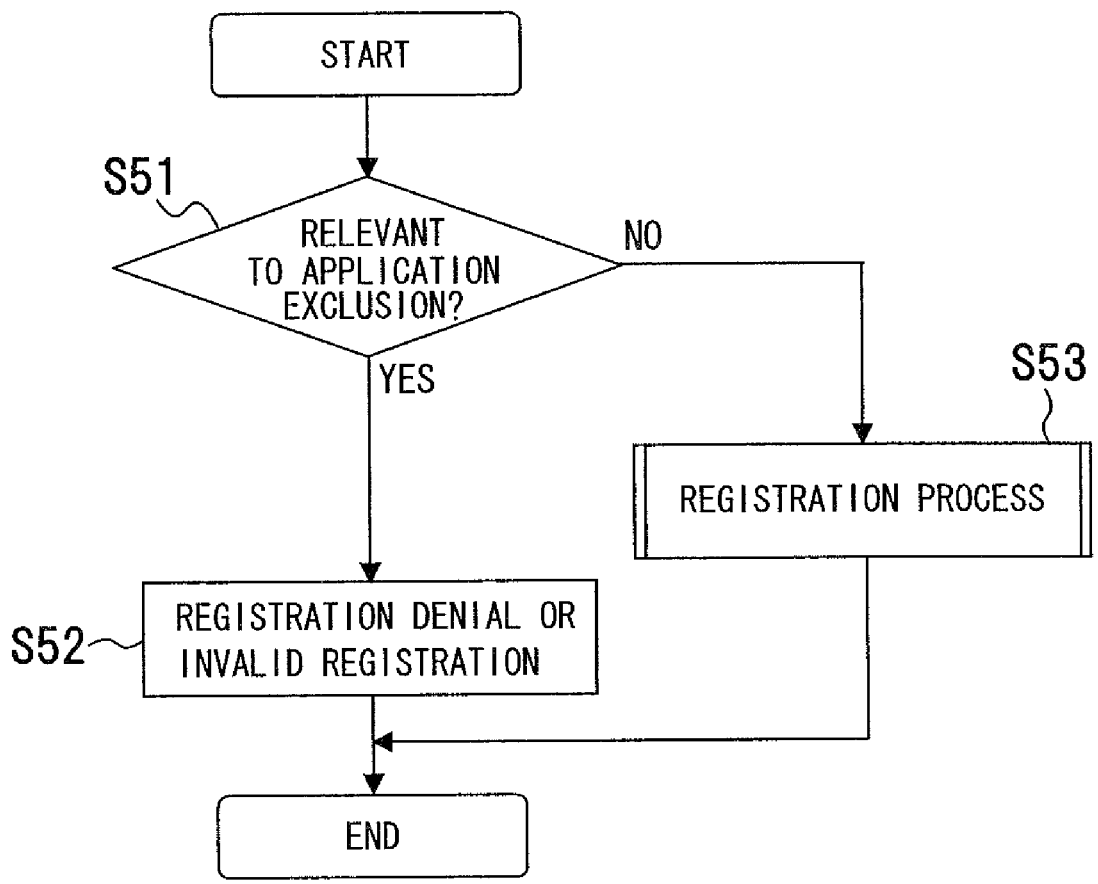
FIG. 12 is a flowchart of a process procedure of a registration processing program for the read out information.
Figure 13:
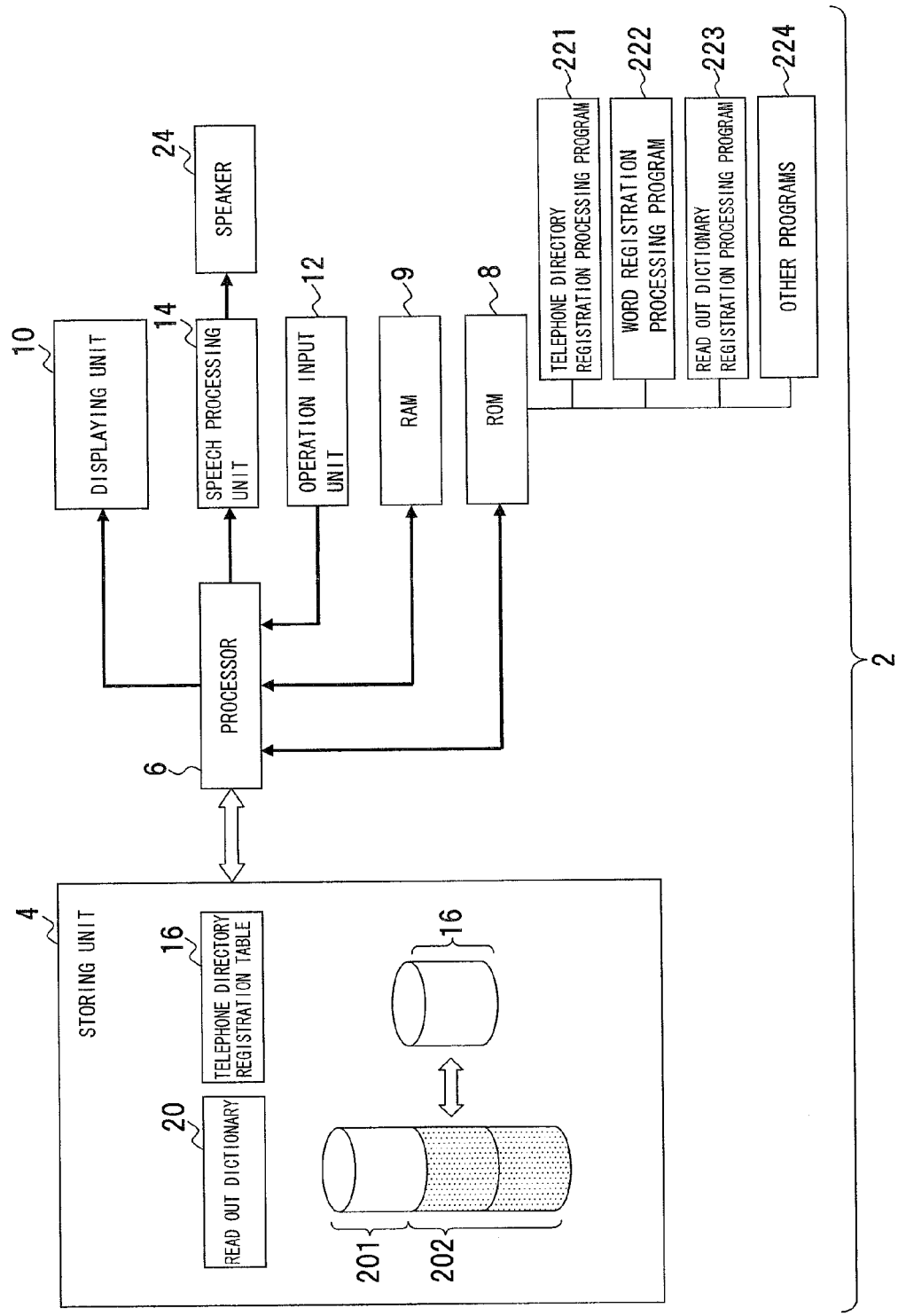
FIG. 13 is a block diagram of a cellular phone according to a third embodiment.

A second embodiment of the present invention will be described with reference to FIGS. 11 and 12. FIG. 11 is a block diagram of a cellular phone according to the second embodiment and FIG. 12 is a flowchart of a process procedure of a registration processing program for the read out information. In FIG. 11, the same numerals are added to the same portions as FIG. 1.

This embodiment has the same configuration as the cellular phone 2 shown in FIG. 1 and, as shown in FIG. 11, the storing unit 4 is disposed with an application exclusion registration table 59 that stores the written information excluded from application of the read out information registration. With regard to the application exclusion registration table 59, it may be determined whether the written information excluded from the application exists or not and the registration of the read out information may be denied or made invalid for the written information relevant to the application exclusion.

In this case, as shown in FIG. 12, the registration processing program of the read out information is activated to determine whether the input of the written information is relevant to the application exclusion or not (step S51), and if relevant (YES at step S51), the registration to the hidden registration area 202 of the read out dictionary 20 is denied or made invalid (step S52) and the process is terminated. If the input is not relevant to the application exclusion (NO at step S51), the registration process (step S53) can be performed to register desired read out information corresponding to the written information.

In this case, the application exclusion registration table 59 may receive registration of not only the written information but also the read out information to prevent improper read out information from being assigned to the written information.

In such a configuration, since a problem may occur in the reading out of the registration information if a name is identical to a place name, etc., appropriate registration information can be achieved by not registering into the hidden registration area 202 or by selecting invalid registration. For example, if the aforementioned application exclusion registration table 59 is disposed as an exclusion dictionary including hiragana, alphabet, katakana, place names, and major proper nouns, the appropriate registration information can be achieved by referring to the information of the table at the time of registration to determine whether the registration is excluded or not. For example, if the registration information of the telephone directory includes registration of a name "A" with FURIGANA "I", speech output using imprecise read out information can be prevented by not registering into the hidden registration area 202 or by making the registration invalid.

Third Embodiment

Although the configuration including the registration dictionary table 18 has been shown in the first embodiment, as shown in FIG. 3, the configuration may include the telephone directory registration table 16 and the hidden registration area 202 of the read out dictionary 20 corresponding to the telephone directory registration table 16. In this case, the read out information of the registration information is registered only for the telephone directory information, and the speech output of the opposite party name can be performed using a nickname.

Fourth Embodiment

Figure 14:
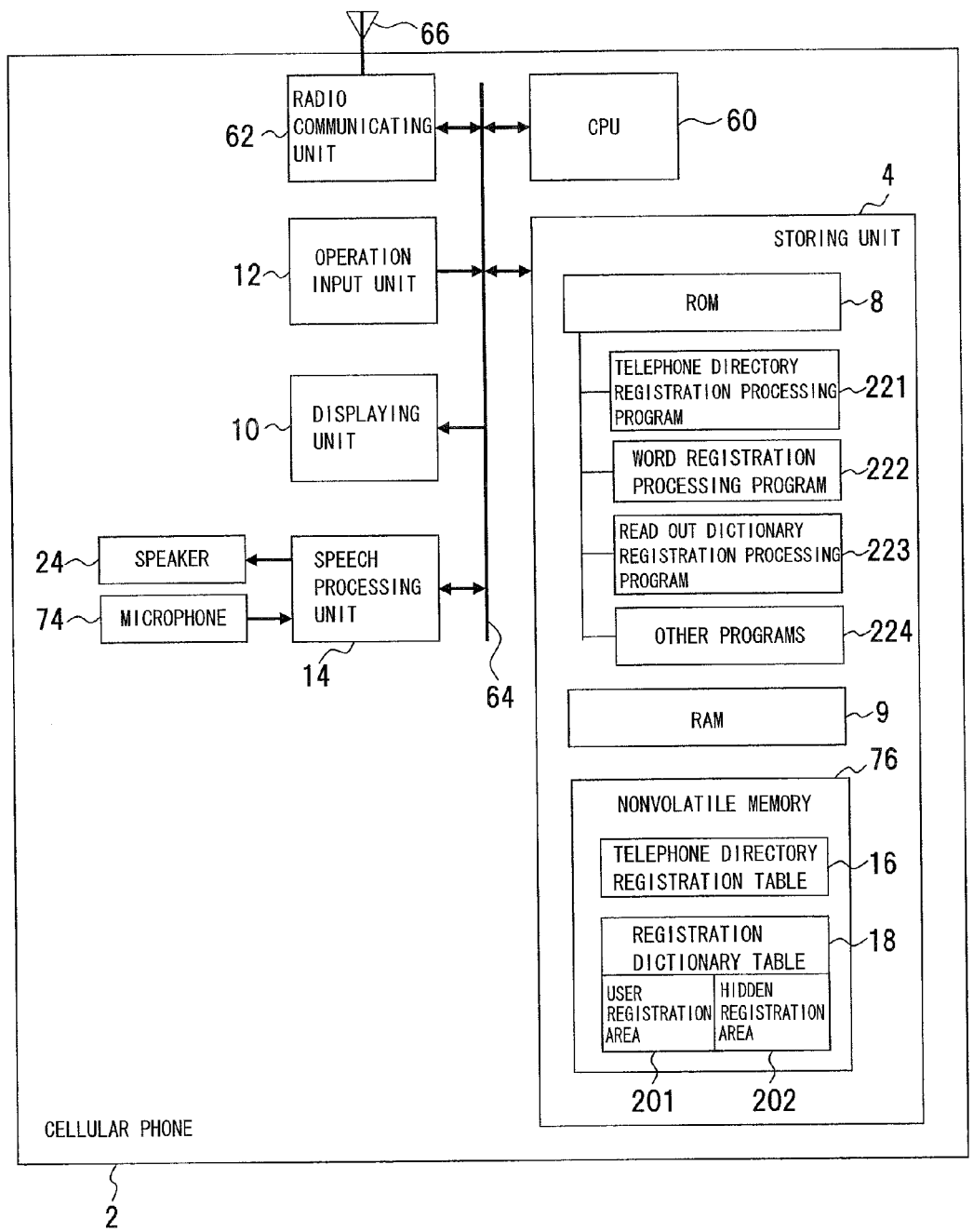
FIG. 14 is a block diagram of a cellular phone according to a fourth embodiment.

A Fourth embodiment of the present invention will be described with reference to FIG. 14. FIG. 14 is a block diagram of an example of a cellular phone. In FIG. 14, the same numerals are added to the same portions as FIG. 1.

The cellular phone 2 is an example of the read out information registration apparatus or portable terminal device and is an embodiment of the read out information registering method and the program thereof.

The cellular phone 2 includes CPU 60, a radio communicating unit 62, the operation input unit 12, the displaying unit 10, the speech processing unit 14, the storing unit 4, etc., and these functional units are connected by a bus 64.

The CPU 60 corresponds to the aforementioned processor 6 (FIG. 1) and executes programs in the storing unit 4 to control the radio communicating unit 62, the operation input unit 12, the displaying unit 10, and the speech processing unit 14 and to write/read information to/from the storing unit 4. The processes performed by the CPU 60 include various controls, for example, a display screen process of the displaying unit 10, a read out setting process, a dictionary registration process and a read out process, and the registration processes are consolidated and performed for the telephone directory registration table 16 and the aforementioned read out dictionary 20.

The radio communicating unit 62 includes an antenna 66, is controlled by the CPU 60, and is connected to a base station with radio signals for the telephone call with the cellular phone of the opposite party and for transmission/reception of e-mails. In this case, the speech signal and the packet data signal are superimposed on a carrier wave and transmitted to the base station, and the radio signal from the base station is demodulated to pick up the speech signal and the packet data.

The operation input unit 12 is constituted by a keyboard, etc. to input information and includes symbol keys, cursor keys, a decision key, etc. Symbol keys 68 (FIG. 15) are used to input symbols such as characters; Cursor keys 70 are used to move a cursor displayed on the screen of the displaying unit 10, for example; a decision key 72 is used to determine or select input information or inquiry information on the dialogue display screen on the displaying unit 10.

The displaying unit 10 is controlled by the CPU 60, is constituted by LCD, etc., and used to present information such as input information or output information. The display screen displays various screens such as the standby screen, dialogue display screen, etc. The display screen displays a document that is the read out target.

The speech processing unit 14 is controlled by the CPU 60, includes the speaker 24 and a microphone 74, reproduces the speech signal as voice from the speaker 24, and converts voice from the microphone 74 to the speech signal that is the electric signal applied to the CPU 60. In this case, symbols and documents are output as the read out voice using the read out information of the aforementioned read out dictionary 20.

The storing unit 4 includes a storing medium such as the ROM 8, the RAM 9, and a nonvolatile memory 76. The ROM 8 stores the telephone directory registration processing program 221, the word registration processing program 222, the read out dictionary registration processing program 223, and other programs 224. The RAM 9 is used as a work area. The nonvolatile memory 76 is constituted by EEPROM (Electrically Erasable Programmable Read-Only Memory), etc. and disposed with the telephone directory registration table 16 and the registration dictionary table 18, etc. and the registration dictionary table 18 is disposed with the user registration area 201 and the hidden registration area 202. The telephone directory registration table 16 stores names of opposite parties, telephone numbers, mail addresses, etc.; the user registration area 201 of the registration dictionary table 18 stores words, etc. selected by a user; and the hidden registration area 202 stores the read out information corresponding to the written information of the telephone directory registration table 16 as described above (FIG. 1).

Figure 15:
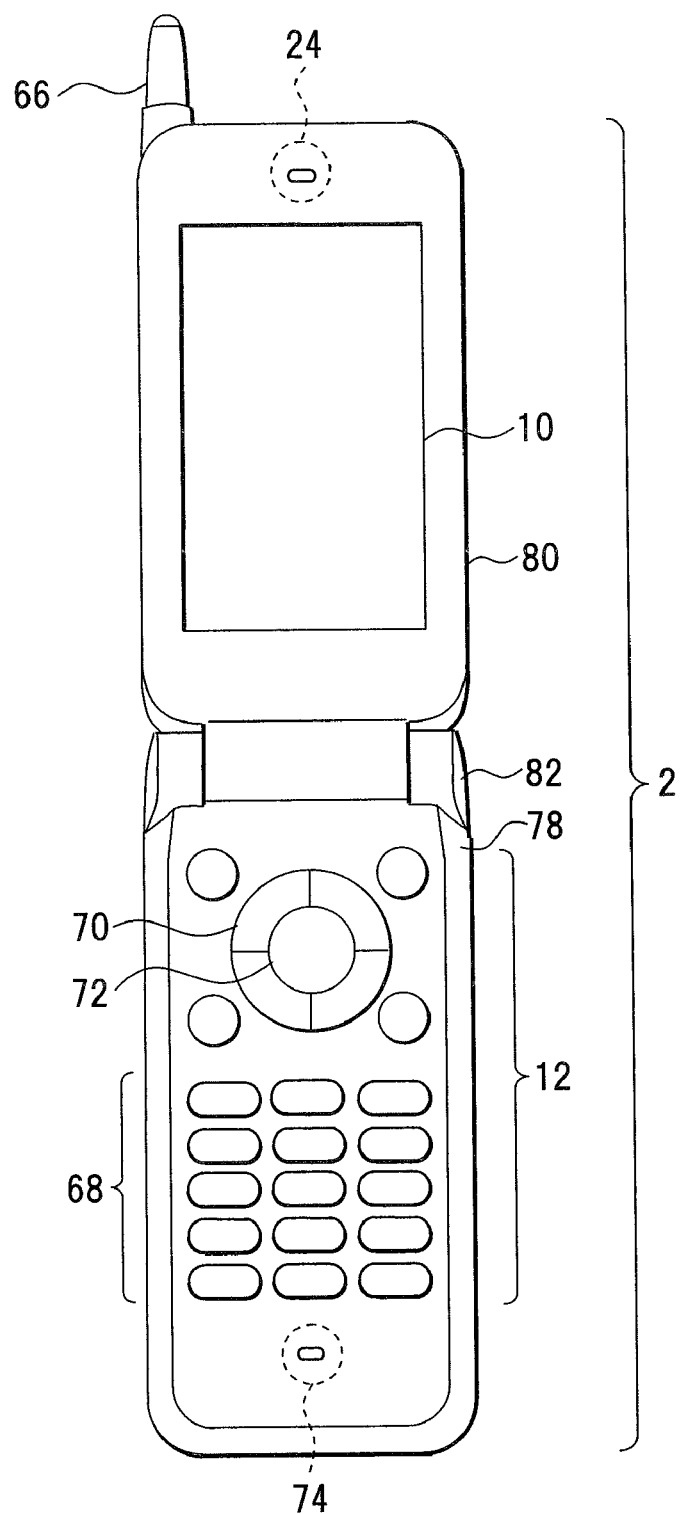
FIG. 15 shows a cellular phone.

As shown in FIG. 15, the cellular phone 2 with this configuration can be opened and closed since first and second chassis units 78, 80 are coupled by a hinge unit 82; the chassis unit 78 houses the symbol keys 68, the cursor keys 70, and the decision key 72 of the operation input unit 12 as well as the microphone 74; and the chassis unit 80 is disposed with the displaying unit 10 and the antenna 66 and houses the speaker 24. The displaying unit 10 displays various screens such as the dialogue display screen.

As is the case with the first embodiment, such a cellular phone 2 can register or delete the read out information corresponding to the written information in a linked manner and the registration can be consolidated for the both pieces of information to maintain the consistency.

Figure 16:
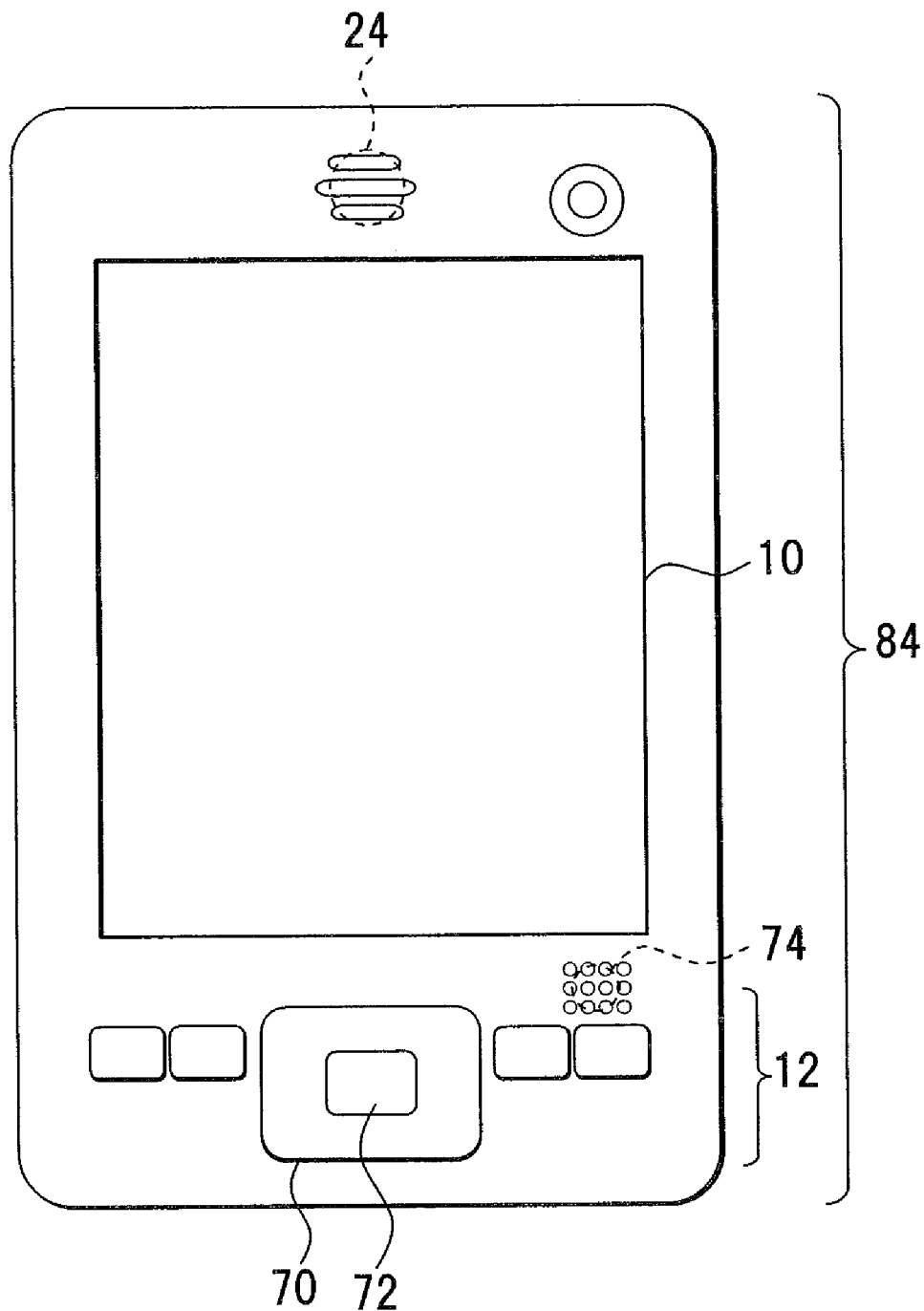
FIG. 16 shows PDA according to the other embodiment.
Figure 17:
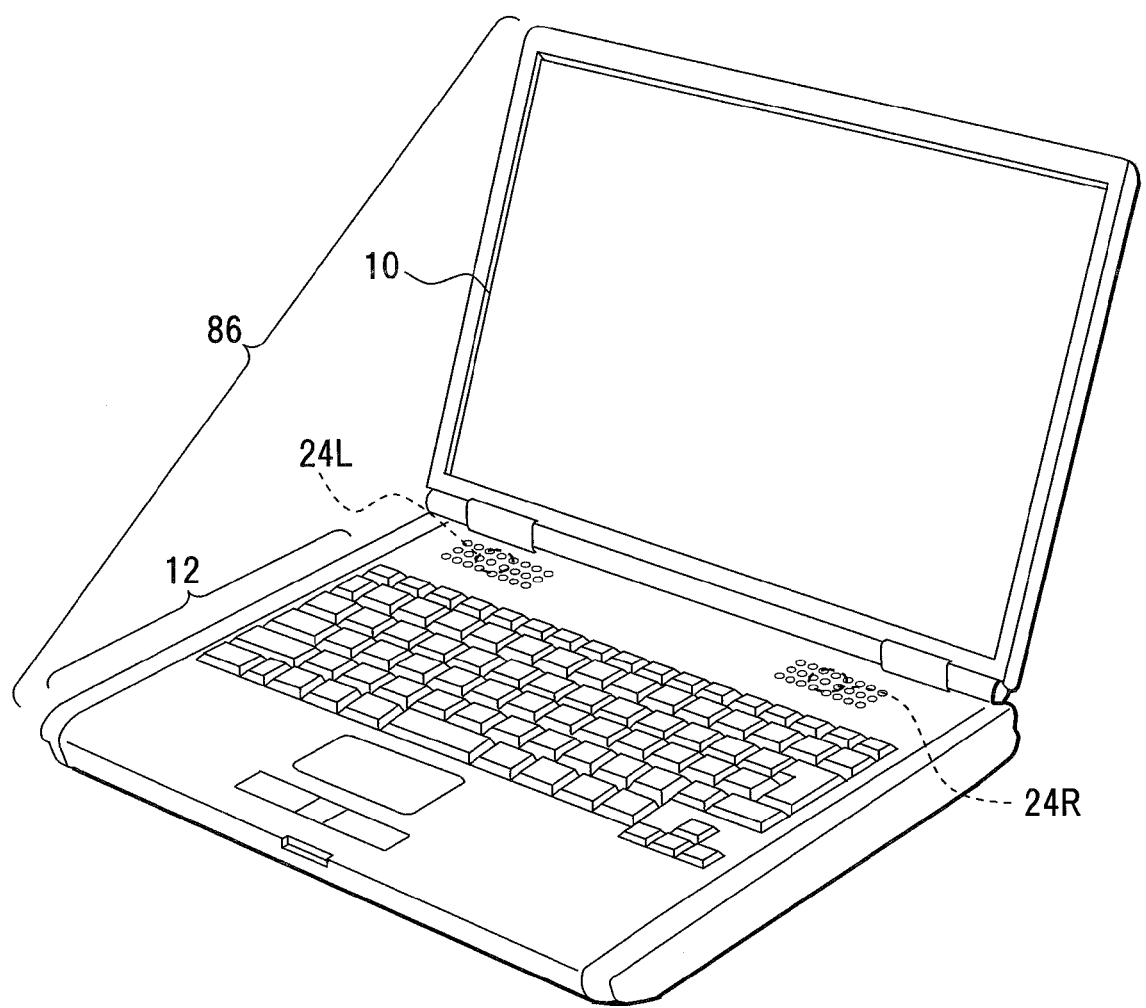
FIG. 17 shows PC according to the other embodiment.

Other Embodiments (1) As described above, the present invention registers the written information in conjunction with the read out information and is not limited to the cellular phone 2 of the above embodiments, and the same effect can be obtained by applying to a personal digital assistant (PDA) 84 shown in FIG. 16, for example, or a personal computer (PC) 86 shown in FIG. 17, for example. In FIGS. 16 and 17, the common numerals are added to the portions in common with FIG. 1 and the description thereof is omitted.

(2) Although the registration table is illustrated as storing means of the written information, the read out information, and the application exclusion registration information in the above embodiments, the present invention may store the information into an external storage device or a removable storage medium.

Since the present invention registers into a memory dictionary the read out information corresponding to the written information such as characters or character strings used in e-mails, etc., links the registrations of the written information and the read out information, and stores the read out information into the hidden registration area to prevent the read out information from being altered or deleted externally, the present invention can advantageously enhance consistency between the written information and the read out information and operationality of the registration.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A read out information registration apparatus that registers read out information corresponding to written information to output the read out information based on retrieval of the written information, the read out information registration apparatus comprising:
   a first registration area where the written information is registered;
   a second registration area where the read out information corresponding to the written information is registered; and
   a processing unit that, in response to an input of the written information which is to be registered to the first registration area, registers the written information to the first registration area, and links and processes the registration of the written information and the registration of the read out information to the second registration area, wherein the read out information is registered to the second registration area in conjunction with the registration of the written information.

2. The read out information registration apparatus of claim 1,
   wherein the second registration area is a hidden area where the read out information cannot be displayed, changed, or deleted.

3. The read out information registration apparatus of claim 1, comprising:
   a third registration area where written information not intended to register the read out information is registered, wherein if information is relevant to the written information of the third registration area, the registration of the read out information to the second registration area is prevented or made invalid.

4. The read out information registration apparatus of claim 1,
   wherein the read out information corresponding to the written information is deleted from the second registration area in conjunction with the deletion of the written information from the first registration area.

5. The read out information registration apparatus of claim 1,
   wherein the written information in the first registration area and the read out information in the second registration area are linked concerning their registration contents.

6. The read out information registration apparatus of claim 1,
   wherein the read out information is registered in conjunction with the registration of the written information, and the read out information is deleted in conjunction with deletion of the written information.

7. The read out information registration apparatus of claim 1,
   wherein the read out information is registered at a same time as the registration of the written information, and the read out information is deleted at the same time as deletion of the written information.

8. The read out information registration apparatus of claim 1,
   wherein a same number of pieces of the read out information as that of the written information registered in the first registration area are registered in the second registration area.

9. A read out information registering method that registers read out information corresponding to written information to output the read out information based on retrieval of the written information, the read out information registering method comprising:
   setting a first registration area where the written information is registered and a second registration area where the read out information is registered, and, in response to an input of the written information, registering the written information to the first registration area; and
   linking and processing registration of the written information to the first registration area and registration of the read out information to the second registration area, wherein
   the read out information is registered to the second registration area in conjunction with the registration of the written information.

10. The read out information registering method of claim 9, comprising:
    determining whether or not written information to be registered is written information not intended to register the read out information; and
    preventing or making invalid the registration of the read out information to the second registration area if the written information to be registered is the written information not intended to register the read out information.

11. The read out information registering method of claim 9, comprising:
    deleting the read out information corresponding to the written information from the second registration area in conjunction with the deletion of the written information from the first registration area.

12. A computer-readable recording medium storing a read out information registering program executable by a computer, that registers read out information corresponding to written information to output the read out information based on retrieval of the written information, the read out information registering program comprising:
    setting a first registration area where the written information is registered and a second registration area where the read out information is registered, and, in response to an input of the written information, registering the written information to the first registration area; and
    linking and processing registration of the written information to the first registration area and registration of the read out information to the second registration area, wherein
    the read out information is registered to the second registration area in conjunction with the registration of the written information.

13. The recording medium of claim 12, comprising:
    determining whether or not written information to be registered is written information not intended to register the read out information; and
    preventing or making invalid the registration of the read out information to the second registration area if the written information to be registered is the written information not intended to register the read out information.

14. The recording medium of claim 12, comprising:
deleting the read out information corresponding to the written information from the second registration area in conjunction with the deletion of the written information from the first registration area.

15. A portable terminal device that registers read out information corresponding to written information to output the read out information based on retrieval of the written information, the portable terminal device comprising:
- a first registration area where the written information is registered;
- a second registration area where the read out information corresponding to the written information is registered; and
- a processing unit that, in response to an input of the written information which is to be registered to the first registration area, registers the written information to the first registration area, and links and processes the registration of the written information and the registration of the read out information to the second registration area, wherein the read out information is registered to the second registration area in conjunction with the registration of the written information.

16. The portable terminal device of claim 15,
wherein the second registration area is a hidden area where the read out information cannot be displayed, changed, or deleted.

17. The portable terminal device of claim 15, comprising:
a third registration area where written information not intended to register the read out information is registered, wherein if information is relevant to the written information of the third registration area, the registration of the read out information to the second registration area is prevented or made invalid.

18. The portable terminal device of claim 15,
wherein the read out information is reading pronunciation related to opposite party information and/or linguistic information.

19. The portable terminal device of claim 15,
wherein the read out information corresponding to the written information is deleted from the second registration area in conjunction with the deletion of the written information from the first registration area.

* * * * *